United States Patent
Ito et al.

(10) Patent No.: US 9,597,975 B2
(45) Date of Patent: Mar. 21, 2017

(54) POWER SUPPLY SYSTEM

(75) Inventors: Akira Ito, Nukata-gun (JP); Junichirou Kanamori, Nisshin (JP); Mitsuru Fujita, Kuwana (JP); Tatsuya Suzuki, Nagoya (JP); Shinkichi Inagaki, Nagoya (JP); Masahiro Sumiya, Nagoya (JP); Takuma Yamaguchi, Nagoya (JP)

(73) Assignees: DENSO CORPORATION, Kariya (JP); National University Corporation Nagoya University, Nagoya-shi (JP)

( * ) Notice: Subject to any disclaimer, the term of this patent is extended or adjusted under 35 U.S.C. 154(b) by 1023 days.

(21) Appl. No.: 13/554,553

(22) Filed: Jul. 20, 2012

(65) Prior Publication Data
US 2013/0024035 A1    Jan. 24, 2013

(30) Foreign Application Priority Data
Jul. 24, 2011    (JP) ................. 2011-161465

(51) Int. Cl.
G06F 1/26 (2006.01)
B60L 11/18 (2006.01)
B60L 3/12 (2006.01)

(52) U.S. Cl.
CPC ............. B60L 11/1844 (2013.01); B60L 3/12 (2013.01); B60L 11/184 (2013.01);
(Continued)

(58) Field of Classification Search
CPC ...... B60L 3/12; B60L 11/1816; B60L 11/184; B60L 11/1842; B60L 11/1844;
(Continued)

(56) References Cited

U.S. PATENT DOCUMENTS

2009/0192655 A1    7/2009    Ichikawa et al.
2010/0076825 A1    3/2010    Sato et al.

FOREIGN PATENT DOCUMENTS

EP    2128439 A1 * 12/2009
JP    08-036560 A    2/1996
(Continued)

OTHER PUBLICATIONS

Ha et al. "Energy management system for a photovoltaic grid-connected building," Sep. 2009. 24th European Photovoltaic Solar Energy Conference, Hamburg, Germany. pp. 21-25.*
Clastres et al., "Optimal household energy management and participation in ancillary services with PV production". Energy, Elsevier, 2010, 35 (1), pp. 55-64.*
(Continued)

*Primary Examiner* — Charles Kasenge
(74) *Attorney, Agent, or Firm* — Posz Law Group, PLC

(57) ABSTRACT

A power supply system for supplying a grid power to a building includes a power generator, a power storing device, and a power controller. The power generator generates off-grid power from a predetermined energy. The power storing device stores the grid power and the off-grid power and supplies the stored power to the building. The power controller controls consumptions of the grid power and the off-grid power. The power controller calculates predicted consumption data related to power consumed in the building and predicted generation data related to power generated by the power generator. The power controller calculates a charging-discharging schedule for the power storing device based on the predicted consumption data and the predicted generation data by formulating the charging-discharging schedule as a mixed integer programming problem.

6 Claims, 8 Drawing Sheets

(52) U.S. Cl.
CPC ....... *B60L 11/1816* (2013.01); *B60L 11/1842* (2013.01); *B60L 11/1846* (2013.01); *B60L 2230/16* (2013.01); *B60L 2230/22* (2013.01); *B60L 2240/66* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
CPC ............. B60L 11/1846; Y02T 10/7291; Y02T 10/7088; Y02T 90/16; Y02T 90/163; Y02T 90/169; Y02E 60/721; Y04S 10/126; Y04S 30/14
USPC ....................................................... 700/291
See application file for complete search history.

(56) References Cited

FOREIGN PATENT DOCUMENTS

| JP | 08-249005 A | 9/1996 |
|---|---|---|
| JP | A-2008-067481 | 3/2008 |
| JP | A-2008-141918 | 6/2008 |
| JP | 2009-284586 A | 12/2009 |

OTHER PUBLICATIONS

Link et al., "Optimisation Algorithms for the Charge Dispatch of Plug-in Vehicles Based on Variable Tariffs." Working paper sustainability and innovation No. S3/2010. Accessed Sep. 18, 2015. http://www.isi.fraunhofer.de/isi-wAssets/docs/e-x/working-papers-sustainability-and-innovation/WP3-2010_optimisation-algorithms.pdf.*

Office Action mailed Oct. 7, 2014 issued in corresponding JP patent application No. 2011-161465 (and English translation).

U.S. Appl. No. 13/485,050, filed May 31, 2012, Ito.

* cited by examiner

POWER SUPPLY SYSTEM

CROSS REFERENCE TO RELATED APPLICATION

This application is based on Japanese Patent Application No. 2011-461465 filed on Jul. 24, 2011 the disclosure of which is incorporated herein by reference.

TECHNICAL FIELD

The present disclosure relates to a power supply system for controlling charging and discharging of a power storing device based on the amount of power consumed and the amount of power generated by a generator such as a solar power generator.

BACKGROUND

In recent years, there has been a demand for a method of minimizing electric bill and carbon dioxide emissions in a building, where multiple power supply sources including a utility grid and a solar power generator and multiples batteries including a power storage unit installed at the building and a vehicle battery mounted on a vehicle are available. In a power supply system disclosed in US 2009/0192655 corresponding to JP 2008-54439A, power exchanged between a vehicle and a building is managed by taking into account power supply conditions in the building.

In order to minimize electric bill and carbon dioxide emissions, a charging-discharging schedule of the battery needs to be determined by taking into account various factors changing with time. For example, the factors can include power consumed in the building, power generated by the solar power generator, power stored in the battery, a period of time where power can be supplied from the vehicle battery to the building, and an unit electricity price depending on time of day. It is difficult to determine an optimum charging-discharging schedule of the battery by taking into account such factors.

SUMMARY

In view of the above, it is an object of the present disclosure to provide a power supply system for determining an optimum charging-discharging schedule of a power storing device.

According to an aspect of the present disclosure, a power supply system is configured to supply a grid power, fed from a grid of a power supplier under a power supply contact, to an electrical load connected to a wire wired in a building. The power supply system includes a solar power generator, a power storing device, and a power controller. The solar power generator generates solar power from sunlight. The power storing device is connectable to the wire. The power storing device is charged to store the grid power and the solar power and discharged to supply the stored power to the wire. The power controller controls a consumption of the grid power and controls a consumption of the solar power. The consumption of the solar power results from at least one of a charge of the power storing device, a consumption in the load, and a discharge back to the grid. The power controller calculates predicted consumption data based on a usage history of the load. The predicted consumption data indicates a change in a predicted amount of power consumed by the load for a predetermined predicted period. The power controller calculates predicted generation data based on predicted weather data. The predicted generation data indicates a change in a predicted amount of the solar power generated by the solar power generator for the predicted period. The predicted weather data indicates a change in a weather for the predicted period. The power controller calculates a charging-discharging schedule based on the predicted consumption data and the predicted generation data by formulating the charging-discharging schedule as a mixed integer programming problem in such a manner that an evaluation index for determining charging and discharging of the power storing device becomes a predetermined value. The charging-discharging schedule indicates a change in the charging and discharging of the power storing device for the predicted period. The power controller controls the charging and discharging of the storing device in accordance with the calculated charging-discharging schedule.

According to another aspect of the present disclosure, a power supply system is configured to supply a grid power, fed from a grid of a power supplier under a power supply contact, to an electrical load connected to a wire wired in a building. The power supply system includes a power generator, a power storing device, and a power controller. The power generator generates off-grid power from a predetermined energy. The power storing device is connectable to the wire. The power storing device is charged to store the grid power and the off-grid power and discharged to supply the stored power to the wire. The power controller controls a consumption of the grid power and controls a consumption of the off-grid power. The consumption of the off-grid power results from at least one of a charge of the power storing device, a consumption in the load, and a discharge back to the grid. The power controller calculates predicted consumption data based on a usage history of the load. The predicted consumption data indicates a change in a predicted amount of power consumed by the load for a predetermined predicted period. The power controller calculates predicted generation data based on predicted predetermined data. The predicted generation data indicates a change in a predicted amount of the off-grid power generated by the power generator for the predicted period. The predicted predetermined data indicates a change in the energy for the predicted period. The power controller calculates a charging-discharging schedule based on the predicted consumption data and the predicted generation data by formulating the charging-discharging schedule as a mixed integer programming problem in such a manner that an evaluation index for determining charging and discharging of the power storing device becomes a predetermined value. The charging-discharging schedule indicates a change in the charging and discharging of the power storing device for the predicted period. The power controller controls the charging and discharging of the power storing device in accordance with the calculated charging-discharging schedule.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

Figure 1:
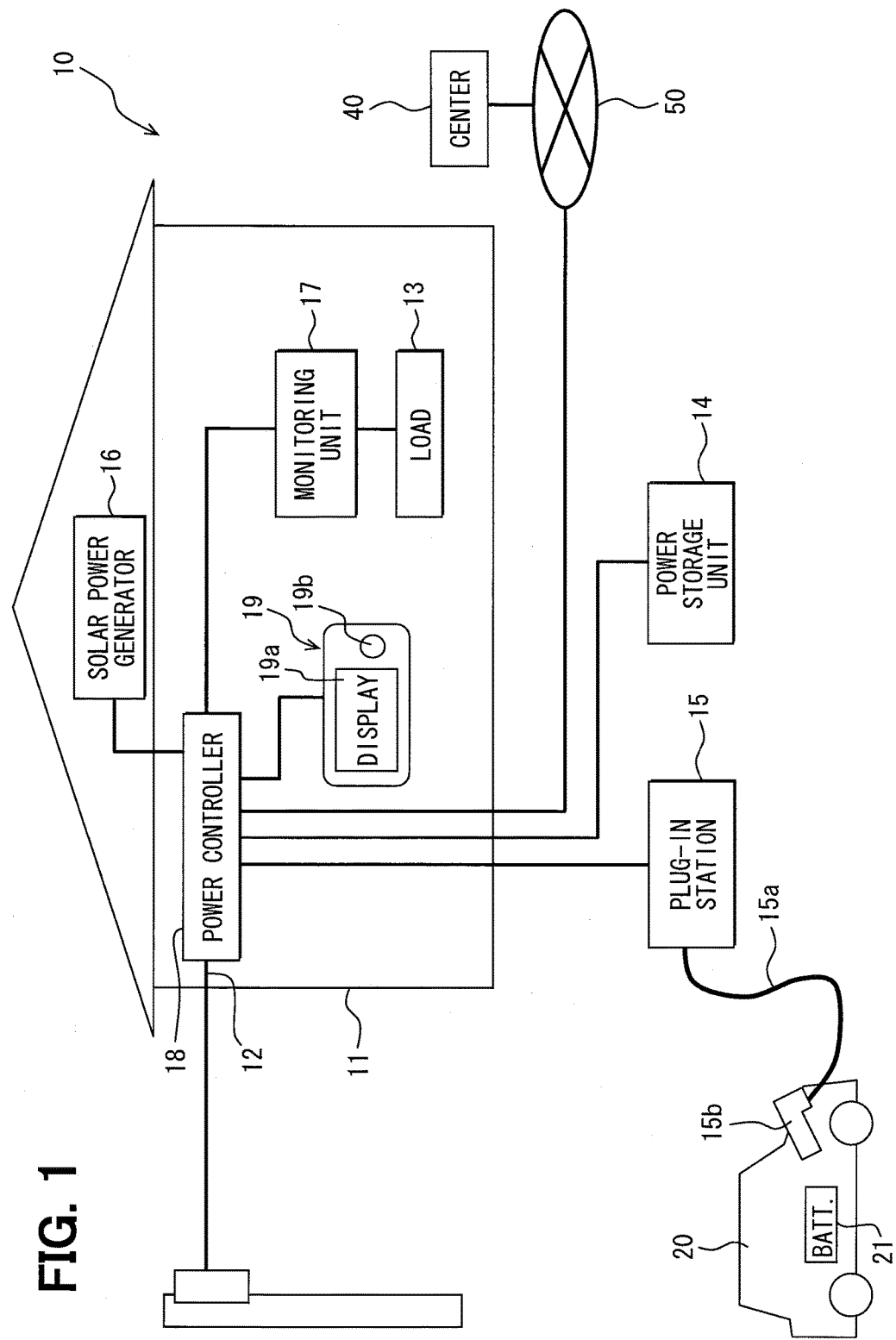
FIG. 1 is a block diagram of a power supply system according to an embodiment of the present disclosure.

A power supply system 10 according to an embodiment of the present disclosure is described below with reference to FIGS. 1-15. FIG. 1 is a simplified block diagram of the power supply system 1. In the power supply system 10, a grid power fed from a power grid of a power supplier under a power supply contract is supplied to a general electric load 13 connected to an alternating current (AC) power line 12 wired in a building 11 such a house.

The power supply system 10 includes the AC power line 12, a power storage unit 14 electrically connected to the AC power line 12, a plug-in station 15 (i.e., power charging station) for charging a vehicle battery 21 by supplying power from the AC power line 12 to a vehicle 20, a solar power generator 16 for generating power from sunlight, the load 13 electrically connected to the AC power line 12, a monitoring unit 17 for monitoring power consumption of the load 13, an integrated power controller 18 for controlling each component, and an operation panel 19 for allowing a user to operate each component. For example, the vehicle 20 can be a plug-in hybrid car, and the vehicle battery 21 can have a relatively large capacity.

The power supply system 10 can communicate with a center 40 outside the building 11 over an Internet network 50. Thus, the power controller 18 can exchange information with the center 40.

For example, the AC power line 12 is a three-wire, single-phase type line consisting of one neutral wire and two voltage wires. The grid power fed from the power grid of the power supplier is supplied to the power controller 18 through the AC power line 12 so that the power controller 18 can serve as a power distribution board. Although not shown in the drawings, the power controller 18 is provided with a main breaker and a current breaker that regulates an upper limit of an electric current flowing through circuit systems to detect current leakage in the circuit systems.

The AC power line 12 branches off from the power controller 18 and goes to the plug-in station 15, the solar power generator 16, the power storage unit 14, and the monitoring unit 17. Further, the AC power line 12 extends from the monitoring unit 17 to the load 13 so that the load 13 can be supplied with power from the AC power line 12.

The monitoring unit 17 detects the power consumption of the load 13 and sends information indicative of the detected power consumption to the power controller 18.

The solar power generator 16 is described in detail below. The solar power generator 16 supplies off-grid power to the AC power line 12. The off-grid power is distinct from the grid power fed from the power grid of the power supplier. The solar power generator 16 has a solar panel (not shown) installed on a roof of the building 11 and generates power from sunlight. Although not shown in the drawings, the solar power generator 16 supplies the generated power to a power conditioning system (PCS) electrically connected to the AC power line 12. The PCS converts direct current (DC) power received from the solar power generator 16 into AC power and feeds the AC power to the AC power line 12.

Next, the power storage unit 14 is described in detail below. The power storage unit 14 is connected to the AC power line 12. For example, the power storage unit 14 is installed outside the building 11. The power storage unit 14 is sometimes called the "e-Station". Although not shown in the drawings, the power storage unit 14 includes a two-way PCS, a battery, and a battery electronic control unit (ECU).

The battery of the power storage unit 14 is a set of cells such as lithium-ion secondary cells. The battery is electrically connected to the AC power line 12 through the two-way PCS. The two-way PCS converts AC power supplied from the AC power line 12 into DC power and supplies the DC power to the battery. Further, the two-way PCS converts DC power supplied from the battery into AC power and supplies the AC power to the AC power line 12.

The battery ECU is connected to the two-way PCS and controls the two-way PCS. Further, the battery ECU is connected communicatively through the two-way PCS to a battery monitoring ECU (not shown) incorporated in the battery. The battery ECU is connected to the power controller 18 and exchanges information with the power controller 18.

Next, the plug-in station 15 is described in detail below. For example, the plug-in station 15 is installed outside the building 11 and separate piece from the power storage unit 14. The plug-in station 15 is connected to the AC power line 12 branching off from the power controller 18. The plug-in station 15 supplies power from the AC power line 12 to the vehicle battery 21 of the vehicle 20. Further, the plug-in station 15 allows the power storage unit 14 to discharge to supply power stored in the power storage unit 14 to the AC power line 12. Although not shown in the drawings, the plug-in station 15 has a discharge power conditioning system (PCS) electrically connected to the AC power line 12. When the power storage unit 14 discharges, the discharge PCS converts DC power received from the power storage unit 14 into AC power to supply the AC power to the AC power line 12.

The plug-in station 15 has a main body and a charge-discharge cable 15a extending from inside to outside of the main body. A first end of the charge-discharge cable 15a is located inside of the main body, and a second end of the charge-discharge cable 15a is located outside of the main body. The AC power line 12 is connected to the first end of the charge-discharge cable 15a. The second end of the charge-discharge cable 15a is provided with a charge-discharge plug (Le., connector) 15b as a connecting terminal. Although not shown in the drawings, the plug-in station 15 has a control ECU inside the main body. The control ECU communicates with the power controller 18 and the vehicle battery 21 to control charging and discharging of the vehicle battery 21.

The vehicle 20 has a receptacle (i.e., outlet) for the charge-discharge plug 15b. The vehicle battery 21 can be charged and discharged through a vehicle charging-discharging unit (not shown) by connecting the charge-discharge plug 15b of the charge-discharge cable 15a to the receptacle of the vehicle 20. In a process of charging the vehicle battery 21, AC power is supplied to the charge-discharge plug 15b, and the vehicle charging-discharging unit converts the AC power into DC power to charge the vehicle battery 21 with the DC power. In a process of discharging the vehicle battery 21, the discharge PCS converts DC power stored in the vehicle battery 21 into AC power to supply the AC power to the AC power line 12. Alternatively, in the process of discharging the vehicle battery 21, the vehicle charging-discharging unit instead of the discharge PCS can convert DC power stored in the vehicle battery 21 into AC power to supply the AC power to the AC power line 12.

Next, the operation panel 19 is described in detail below. For example, the operation panel 19 is a remote controller wired in the building 11. The operation panel 19 is connected to the power controller 18. The operation panel 19 has a display 19a as a report device and an operation switch 19b for operating each component. For example, the display 19a can display a state of charge (SOC) of the power storage unit 14, the amount of power generated by the solar power generator 16, the amount of power consumed by the load 13, a state of charge (SOC) of the vehicle battery 21, and the amount of power flowing back to the power grid. The operation switch 19b can allow a user to input a command, for example, for charging the power storage unit 14, for charging the vehicle battery 21, and for performing various settings.

Next, the power controller 18 is described in detail below. The power controller 18 is connected to each component to control the component in accordance with the command inputted though the operation switch 19b of the operation panel 19. Further, the power controller 18 controls the display 19a of the operation panel 19 so that a state of each component can be displayed on the display 19a.

Although not shown in the drawings, the power controller 18 includes an input circuit, a microcomputer, and an output circuit. A communication signal and a detection signal from an atmospheric pressure sensor are inputted to the input circuit. The microcomputer performs computations based on the signals from the input circuit. The output circuit outputs a control signal for controlling each component based on the computation results. The microcomputer has a memory device including a read-only memory (ROM) and a random access memory (RAM). The memory device stores data of the detected atmospheric pressure and the computation results. The microcomputer performs various processing based on programs prestored in the memory device. The programs can be updated. The microcomputer of the power controller 18 will be hereinafter sometimes called the "power controller 18".

The power controller 18 calculates a predicted power consumption based on a usage history of the load 13. The predicted power consumption is the predicted amount of power consumed by the load 13 for a predetermined predicted period from the present time. According to the embodiment, the predicted period is defined as twenty-four hours from the present time. Further, the power controller 18 calculates a predicted power generation based on predicted weather data. The predicted power generation is the predicted amount of power generated by the solar power generator 16 for the predicted period. Specifically, the power controller 18 predicts weather for the predicted period based on the atmospheric pressure detected by the atmospheric pressure sensor and calculates the predicted power generation based on the predicted weather and a previous power generation history of the solar power generator 16. The previous power generation history represents the actual amount of power previously generated by the solar power generator 16 under the predicted weather condition.

Further, the power controller 18 calculates predicted consumption data and predicted generation data by using information received from the monitoring unit 17. The predicted consumption data indicates a change in the predicted power consumption per unit time (e.g., per minute or hour) during the predicted period. The predicted generation data indicates a change in the predicted power generation per unit time (e.g., per minute or hour) during the predicted period.

The power controller 18 controls charging and discharging of the power storage unit 14 and the vehicle battery 21 in accordance with a charging-discharging schedule stored in the memory device. Specifically, the power controller 18 controls power for charging the power storage unit 14 and the vehicle battery 21 and also controls power discharged from the power storage unit 14 and the vehicle battery 21 to the AC power line 12. The charging-discharging schedule is determined based on the predicted consumption data, the predicted generation data, and a usage schedule on which the vehicle battery 21 will be used.

In a weather prediction operation performed by the power controller 18, the predicted power generation during the predicted period is determined based on parameters including the detected atmospheric pressure, a vibration rate of the detected atmospheric pressure, and a change rate of the detected atmospheric pressure. Thus, the power controller 18 serves as an obtaining device for obtaining the predicted weather data. For example, the power controller 18 can store a map used for the weather prediction operation in the memory device. In the map, the vibration rate is classified broadly into two groups, and an inequality relating to the change rate is further classified into multiple groups for each vibration rate, and an inequality relating to the atmospheric pressure is further assigned to each group of the change rate. One predicted power generation can be determined by applying the parameters of the atmospheric pressure, the vibration rate, and the change rate to the map. For example, the atmospheric pressure used for the weather prediction operation can be detected at the present time, and the vibration rate and the change rate used for the weather prediction operation can be detected during a period from four hours ago to the present time. Thus, the map stored in the memory device of the power controller 18 shows a correlation between the previous atmospheric pressure data and the previous solar power generation. The power controller 18 determines the predicted power generation for the predicted period based on the atmospheric pressure by using the map. This map can be sequentially updated, for example, by recording the previous atmospheric pressure data and the previous power generation history.

Generally, an electric power price varies depending on the time (i.e., hour) of the day. The power controller 18 causes the power storage unit 14 to store power during a period of time where the power price is cheaper. For example, each of the power storage unit 14 and the vehicle battery 21 can be charged late at night to its full charge capacity.

The power controller 18 can perform processing by exchanging information with the center 40 over the Internet network 50. For example, the power controller 18 can send information, such as the usage history of the load 13, stored in the memory device to the center 40, and the center 40 can send weather information to the power controller 18. The power controller 18 can perform the weather prediction operation using the weather information received from the center 40. The power controller 18 can send data, necessary for the center 40 to determine the charging-discharging schedule, to the center 40 and then receive the charging-discharging schedule from the center 40.

Figure 2:
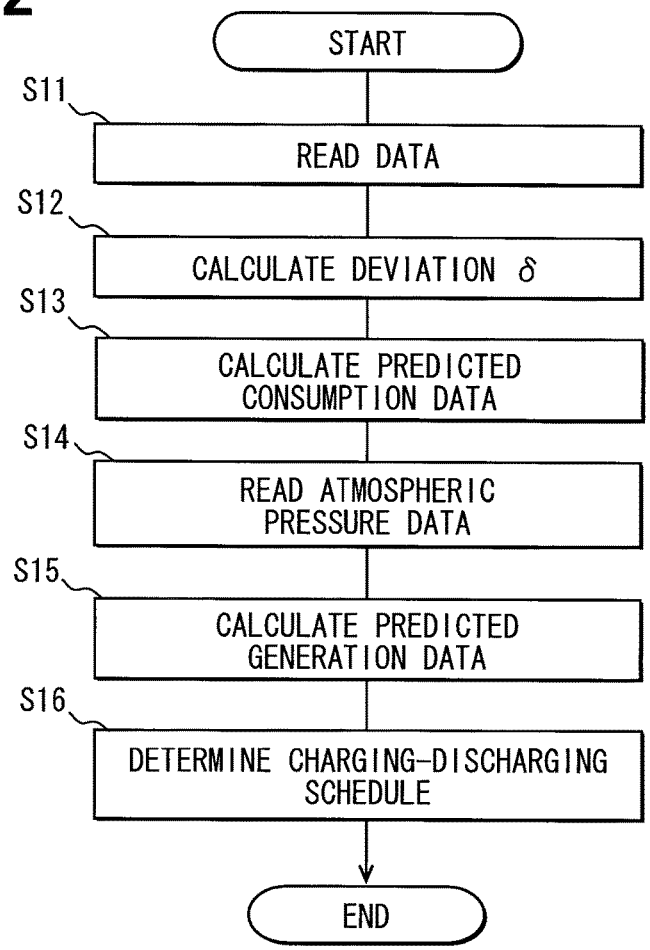
FIG. 2 is a flow chart of a schedule determination process.

FIG. 2 is a flow chart of a schedule determination process for determining the charging-discharging schedule. When the power controller 18 is activated, the power controller 18 performs the schedule determination process at a predetermined interval. For example, the interval can be set to one hour.

The schedule determination process starts at step S11, where the power controller 18 reads data from the memory device. The data read at S11 includes a previous history of the power consumption of the load 13 and a previous history of the power generation of the solar power generator 16. Each previous history is a history of a predetermined number of days (e.g., 14 days) in the past. The previous history includes two kinds of data, i.e., a weekday history and a holiday history (e.g., Saturday and Sunday). One of the weekday history and the holiday history is read at S11 according to the day of the week on which the schedule determination process is performed.

Then, the schedule determination process proceeds to S12, where the power controller 18 calculates a deviation δ of the power consumption based on the previous history of the power consumption that was read at S11. Then, the schedule determination process proceeds to S13, where the power controller 18 calculates the predicted consumption data for the predicted period by adding the deviation δ to an average value of the previous history of the power consumption. If a usage schedule of the load 13 for the predicted period is already known, the predicted consumption data can be calculated by taking into account the usage schedule of the load 13. Further, another schedule, such as indicating that a user will stay in the building 11 on a certain day (e.g., Monday) of the week despite the fact the user is usually out of the building 11 on the day, can be taken into account to calculate the predicted consumption data. That is, the previous history of the power consumption can include data of a season, a day of the week, a time of the day, and the number of persons in the building 11.

Then, the schedule determination process proceeds to S14, where the power controller 18 reads the atmospheric pressure data from the memory device. For example, all the atmospheric pressure data during a period from a predetermined time ago (e.g., four hours ago) to the present time can be read at S14.

Then, the schedule determination process proceeds to S15, where the power controller 18 calculates the predicted generation data for the predicted period based on the atmospheric pressure data that was read at S14. Specifically, at S15, the power controller 18 determines one predicted power generation by applying the parameters of the atmospheric pressure, the vibration rate of the atmospheric pressure, and the change rate of the atmospheric pressure to the map that is stored in the memory device and shows the correlation between the atmospheric pressure and the solar power generation.

Then, the schedule determination process proceeds to S16, where the power controller 18 determines the charging-discharging schedule based on the predicted consumption data and the predicted generation data. Then, the schedule determination process is ended. The charging-discharging schedule is determined so that an evaluation index can have a predetermined value. The evaluation index is a power price calculated by subtracting a power purchase price from a power selling price. The power purchase price is a price at which a user purchases power from the power supplier. Specifically, the power purchase price is calculated by multiplying a unit power purchase price, which is based on the power supply contract, by the total power supplied from the AC power line 12. The power selling price is a price at which a user sells power to the power supplier. Specifically, the power selling price is calculated by multiplying an unit power selling price, which is based on the power supply contract, by the total power flowing back to (i.e., discharged to) the AC power line 12. When the power price is positive, the user pays the power price to the power supplier. In contrast, when the power price is negative, the user receives the power price from the power supplier. The charging-discharging schedule is determined so that the power price as the evaluation index can have a minimum value as the predetermined value.

The charging-discharging schedule during the predicted period is determined by the above-described schedule determination process. According to the embodiment, the schedule determination process is performed at an interval of one hour, and the predicted period is twenty-four hours. Since the schedule determination process is performed at an interval less than the predicted period, the charging-discharging schedule is updated at the interval based on the latest predicted weather data. Thus, the power controller 18 controls the charging and discharging of the power storage unit 14 and the vehicle battery 21 during the predicted period in accordance with the updated charging-discharging schedule. Since the charging-discharging schedule is updated at an interval of one hour during twenty-four hours, the power controller 18 controls the charging and discharging of the power storage unit 14 and the vehicle battery 21 during one hour in accordance with the latest updated charging-discharging schedule.

A method of determining the charging-discharging schedule is described in detail below. According to the embodiment, the charging-discharging schedule is formulated as a mixed integer programming (MIP) problem, which is a kind of mathematical programming problem. Formulations of the mixed integer programming problem are prestored in the memory device of the power controller 18. The power controller 18 determines the charging-discharging schedule by calculating optimization variables of the mixed integer programming problem prestored in the memory deice. That is, the optimization variables of the mixed integer programming problem become the charging-discharging schedule.

A method of formulating the charging-discharging schedule as the mixed integer programming problem is described in detail below.

Firstly, definitions of variables are described. The optimization variables for the mixed integer programming problem are shown in a section [NUMBUR 1].

[NUMBUR 1]

$P_j^v(t)$: power handled by the vehicle battery 21 at a time t [kW]

$P_i^e(t)$: power handled by the power storage unit 14 at a time t [kW]

A positive value of each of $P_j^v(t)$ and $P_i^e(t)$ represents charging and a negative value of each of $P_j^v(t)$ and $P_i^e(t)$ means discharging.

Known information are listed below in a section [NUMBUR 2]. The information shown in the section [NUMBUR 2] are the predicted consumption data, the predicted generation data, information inputted by a user, information prestored in the memory device of the power controller 18, and the like.

[NUMBUR 2]

$W^+(t) \geq 0$: power consumption in the building 11 at a time t[kW]

$W^-(t) \leq 0$: solar power generation in the building 11 at a time t[kW], $f^+(t) > 0$: evaluation coefficient of purchased power amount at a time t[yen/kWh], $f^-(t) > 0$: evaluation coefficient of sold power amount at a time t[yen/kWh], $B_j^{v,min}(t) > 0$: minimum remaining amount in the vehicle battery 21 at a time t[kWh], $B_i^{e,min}(t) > 0$: minimum remaining amount in the power storage unit 14 at a time t[kWh], $B_j^{v,max} > 0$: capacity of the vehicle battery 21 [kWh], $B_i^{e,max} > 0$: capacity of the power storage unit 14 [kWh], $P_j^{v,cons}(t) > 0$: power consumption in the vehicle battery 21 due to running of the vehicle 20 at a time t [kW], $P_j^{v,dis} < 0$: maximum discharge amount of the vehicle battery 21 [kW], $P_j^{v,char} > 0$: maximum charge amount of the vehicle battery 21 [kW], $P_i^{e,dis} < 0$: maximum discharge amount of the power storage unit 14 [kW], $P_i^{e,char} > 0$: maximum charge amount of the power storage unit 14 [kW], $W_{max} > 0$: instantaneous power consumption upper limit [kW], $J_{max} > 0$: total power consumption upper limit [kWh], $B_j^{v,init} > 0$: charge amount in the vehicle battery 21 at the start of control [kWh], $B_i^{e,init} > 0$: charge amount in the power storage unit 14 at the start of control [kWh], and $r_j(t)$: logical variable indicating whether the vehicle 20 is used or unused at a time t (used 1, unused 0).

Next, constraints are formulated. The constrains are prestored in the memory device of the power controller 18. The constraint for an instantaneous power consumption is shown in a section [NUMBUR 3].

$$W(t) \leq W_{max} \qquad \text{[NUMBUR 3]}$$

When the number of the vehicles 20 is N, and the number of batteries of the power storage unit 14 is M, W(t) is defined as shown in a section [NUMBUR 4].

$$W(t) = W^+(t) + W^-(t) + \sum_{j=1}^{N} P_j^v(t) + \sum_{i=1}^{M} P_i^e(t) \qquad \text{[NUMBUR 4]}$$

The constraint for the total power consumption is shown in a section [NUMBUR 5].

$$\sum_{t=0}^{T} W(t)\Delta t \leq J_{max} \qquad \text{[NUMBUR 5]}$$

In the formula shown in the section [NUMBUR 5], $J_{max}$ represents an upper limit of the total power consumption in the building 11 from the present time t to a time t+T.

The constraint for a minimum maintenance requirement for the remaining amount of the vehicle battery 21 is shown in a section [NUMBUR 6].

$$B_j^{v,min}(t) \leq b_j^v(t) \leq B_j^{v,max} \qquad \text{[NUMBUR 6]}$$

In the formula shown in the section [NUMBUR 6], a lower limit has an argument of a time t. Therefore, a user can change the minimum maintenance requirement depending on the time t.

The constraint for charging the vehicle battery 21 to its full capacity at a predetermined time $T^{char}$ is shown in a section [NUMBUR 7].

$$b_j^v(T^{char}) = B_j^{v,max} \qquad \text{[NUMBUR 7]}$$

The right member of the formula in the section [NUMBUR 7] can be equal to or less than the full capacity.

The constraint for preventing the vehicle battery 21 from being charged and discharged by the plug-in station 15 during use of the vehicle 20 is shown in a section [NUMBUR 8], $$P_j^v(t) r_j(t) = 0 \qquad \text{[NUMBUR 8]}$$

As mentioned previously, the logical variable $r_j(t)$ indicates whether the vehicle 20 is used or unused at a time t (used 1, unused 0).

A predicted update of the vehicle battery 21 due to the use of the vehicle 20 is shown in a section [NUMBUR 9].

$$b_j^v(t) = b_j^v(t-1) + \{(1-r_j(t))p_j^v(t) - r_j(t)P_j^{cons}(t)\}\Delta t \qquad \text{[NUMBUR 9]}$$

The constraint for charging the power storage unit 14 to its full capacity at a predetermined time $T^{char}$ is shown in a section [NUMBUR 8].

$$b_i^e(T^{char}) = B_i^{e,max} \qquad \text{[NUMBUR 8]}$$

The right member of the formula in the section [NUMBUR 10] can be equal to or less than the full capacity.

The constraint for a minimum maintenance requirement for the remaining amount of the power storage unit 14 is shown in a section [NUMBUR 11].

$$B_i^{e,min}(t) \leq b_i^e(t) \leq B_i^{e,max} \qquad \text{[NUMBER 11]}$$

$$b_i^e(t) = \sum_{s=0}^{t} p_i^e(s)\Delta t + B_i^{e,init}$$

In the first formula shown in the section [NUMBUR 11], a lower limit has an argument of a time t. Therefore, a user can change the minimum maintenance requirement depending on the time t.

The constraint for an instantaneous charge and discharge performance of the vehicle battery 21 is shown in a section [NUMBUR 12]. The section [NUMBUR 12] shows upper and lower limits of a charge and discharge performance of the vehicle battery 21.

$$P_j^{v,dis} \leq p_j^v(t) \leq P_j^{v,char} \qquad \text{[NUMBUR 12]}$$

The constraint for an instantaneous charge and discharge performance of the power storage unit 14 is shown in a section [NUMBUR 13].

$$P_i^{e,dis} \leq p_i^e(t) \leq P_i^{e,char} \qquad \text{[NUMBUR 13]}$$

The constraint for preventing the amount of power discharged from the power storage unit 14 and the vehicle battery 21 from exceeding the power consumption in the building 11 is shown in a section [NUMBUR 14]. That is, the section [NUMBUR 14] shows that only the solar power generation in the building 11 can be sold.

$$\sum_{j=1}^{N} p_j^v(t) + \sum_{i=1}^{M} P_i^e(t) \geq -W^+(t) \quad \text{[NUMBUR 14]}$$

An optimum charging-discharging schedule of the power storage unit 14 and the vehicle battery 21 having an if-then constraint is formulated as a mixed integer programming problem and shown in a section [NUMBUR 15].

$$Z = \sum_{\tau=t}^{t+T} F(\tau) \left\{ W^+(\tau) + W^-(\tau) + \sum_{j=1}^{N} P_j^v(\tau) + \sum_{i=1}^{M} P_i^e(\tau) \right\} \Delta t$$

$$= \sum_{\tau=t}^{t+T} F(\tau) W(\tau) \Delta t$$

[NUMBUR 15]

Even when a constrain involves a conditional branching, the charging-discharging schedule can be formulated as a mixed integer programming problem by using a mixed logic dynamic system (MLDS) model in such a manner that the conditional branching is expressed by a linear inequality constraint with a logical variable. Thus, even when an evaluation function has an if-then constraint, the formulation can be achieved. For example, even when the evaluation is different between when power is purchased and when power is sold, the formulation can be archived.

Specifically, the formulation shown in the section [NUMBUR 15] is rewritten as shown in a section [NUMBUR 16] by using a logical variable δ(t).

$$Z = \sum_{\tau=t}^{t+T} \{f^+(\tau) + (1 - \delta(\tau)) f^-(\tau)\} W(\tau) \Delta t \quad \text{[NUMBUR 16]}$$

$$\begin{cases} W(\tau) \geq m(1 - \delta(\tau)) \\ W(\tau) \leq (M + \varepsilon)\delta(\tau) - \varepsilon \\ \delta(\tau) \in \{0, 1\} \end{cases}$$

As described above, the formulation shown in the section [NUMBUR 15] is rewritten in an evaluation function subject to inequality constraints shown in the section [NUMBUR 16]. The value of m is a constant value less than zero (m<0), and the value of M is a constant value more than zero (M>0). Thus, the power price from the present time to the time T can be evaluated as the evaluation function. The positive evaluation value indicates the purchase price of power, and the negative evaluation value indicates the sale price of power. The coefficient of $f^+(t)$ represents the amount of carbon dioxide emissions during power consumption (m$^3$/kWh), and the coefficient of $f^-(t)$ represents the amount of carbon dioxide reduction during power generation (m$^3$/kWh). Therefore, the total amount of carbon dioxide emissions from the present time to the time T can be evaluated as the evaluation function. The positive evaluation value indicates the total amount of carbon dioxide emissions, and the negative evaluation value indicates the total amount of carbon dioxide reduction.

Likewise, the evaluation can be achieved even when a constraint related to the use of the vehicle 20 has an if-then constraint. Further, even when a constraint expressing the number of times the power storage unit 14 and the vehicle battery 21 can be charged and discharged (i.e., cycled) is included, the evaluation can be achieved. Further, even when multiple power storage units 14 and multiple vehicle batteries 21 are connected in the power supply system 10, the evaluation can be achieved.

The power controller 18 calculates the optimization variables shown in the section [NUMBUR 1] so that the value of Z (power price) shown in the section [NUMBUR 16] can be minimized. Thus, as mentioned previously, the optimization variables shown in the section [NUMBUR 1] become the charging-discharging schedule.

According to the embodiment, the power controller 18 performs the schedule determination process at an interval of one hour, and the predicted period is twenty-four hours. That is, the interval at which the schedule determination process is performed is one-twenty fourth of the predicted period. Thus, the charging-discharging schedule can be suitably updated based on the latest predicted weather data. In other words, a receding horizon optimization method is used. Specifically, since a power demand prediction is performed based on the latest information at the interval Δt, a sudden change in the power demand prediction can be covered. A charging-discharging pattern (($P_j^v(t)$, $P_j^v(t+\Delta t)$, $P_j^v(t+2\Delta t)$ . . . , $P_j^v(t+T)$), ($P_i^e(t)$, $P_i^e(t+\Delta t)$, $P_i^e(t+2\Delta t)$ . . . , $P_i^e(t+T)$)) is calculated by determining a charging-discharging schedule for optimizing an evaluation function from the present time t to a time t+T. During the first interval from the present time t to a time t+Δt, the charging and discharging of the power storage unit 14 and the vehicle battery 21 is performed in accordance with the charging-discharging schedule $P_j^v(t)$, $P_i^e(t)$. Then, when the time period Δt has elapsed (i.e., when the present time becomes the time t+Δt) the same process is repeated by substituting t+Δt into t.

Next, relationships between time (i.e., hour) of day and the amount of power purchased from the power supplier and the amount of power remaining in the vehicle battery 21 are described below with reference to FIGS. 3-15. It is noted that time is expressed in 24-hour (i.e., military) clock format in FIGS. 3-15.

Figure 3:
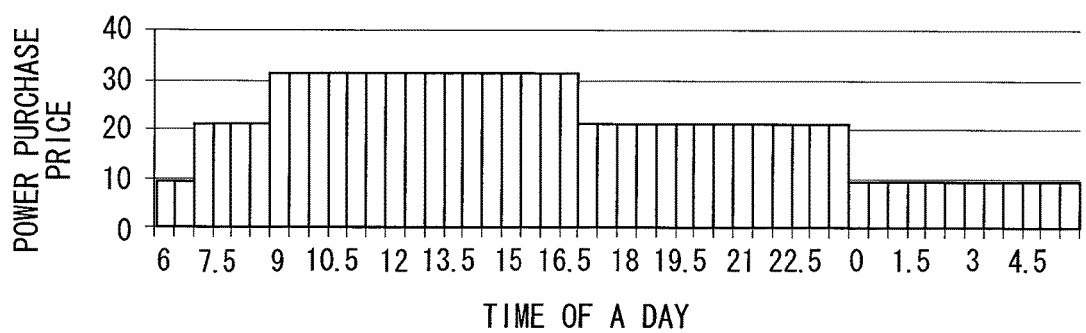
FIG. 3 is a graph showing a power purchase price.

FIG. 3 is a graph showing a power purchase price, which is a price of power purchased from the power supplier. As can be seen from FIG. 3, the power purchase price varies depending on time of day. In an example of FIG. 3, a price lowest period where the power purchase price is lowest is from 0:00 (12 am) to 7:00 (7 am), and a price highest period where the power purchase prices is highest is from 9:00 (9 am) to 17:00 (5 pm). Specifically, the power purchase price is 21.2 yen per kilowatt hour (yen/kWh) from 7:00 (7 am) to 9:00 (9 am) and from 17:00 (5 am) to 0:00 (12 am), 31.4 yen/kWh from 9:00 (9 am) to 17 pm (5 pm), and 9.3 yen/kWh from 0:00 (12 am) to 7:00 (7 am). In contrast, a power sale price, which is a price of power sold to the power supplier, is constant at 48 yen/kWh regardless of time of day.

FIGS. 4, 6, 8, 10, 12, and 14 are graphs showing the net amount of power purchased from the power supplier in various cases. In FIGS. 4, 6, 8, 10, 12, and 14, a thin line represents the net amount of power purchased from the power supplier before optimization, and a bold line represents the net amount of power purchased from the power supplier after optimization. It is noted that a negative value of the net amount of power purchased from the power supplier means the net amount of power sold to the power supplier. FIGS. 5, 7, 9, 11, 13, and 15 are graphs showing the amount of power remaining in the vehicle battery 21 in various cases. In the cases of FIGS. 4-15, the power storage unit 14 is not used so that the effect of the use of power stored in the vehicle battery 21 can be easily understood.

Figure 4:
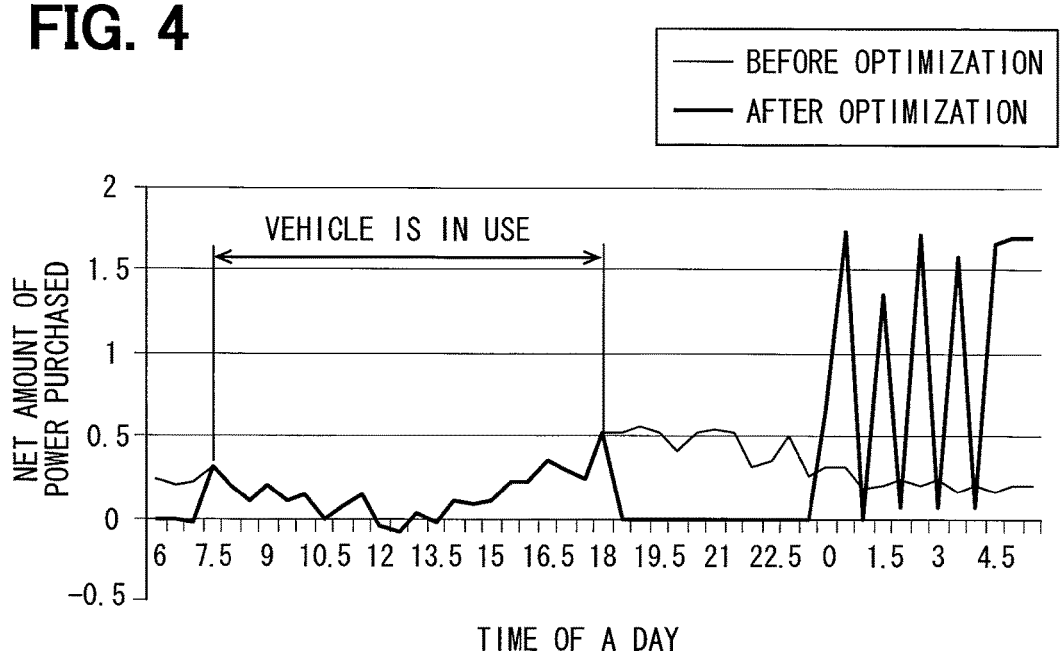
FIG. 4 is a graph showing the net amount of power purchased from a grid in a first case.
Figure 5:
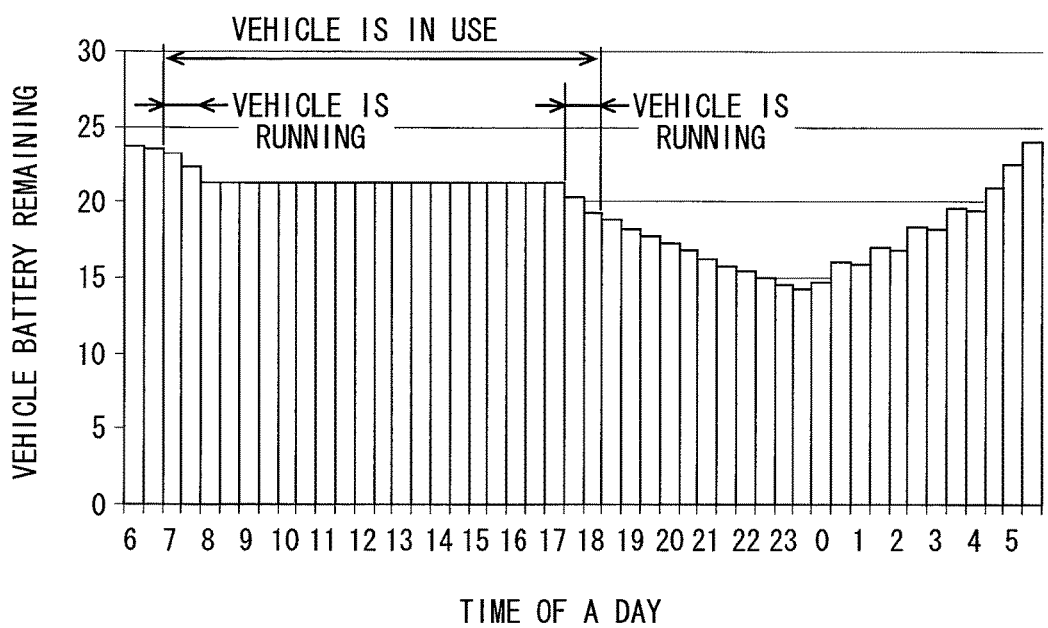
FIG. 5 is a graph showing the amount of power remaining in a vehicle battery in the first case.

FIG. 4 is a graph showing the net amount of power purchased from the power supplier in a first case. FIG. 5 is a graph showing the amount of power remaining in the vehicle battery 21 in the first case. The first case is where the vehicle 20 is used in the daytime for commuting. In the first case, the vehicle 20 is in use during an in-use period from 7:00 (7 am) to 18:00 (6 pm). In other words, the vehicle 20 is not connected to the plug-in station 15 during the in-use period. Specifically, the vehicle 20 is running to and from a user's office during some portion of the in-use period and parked at the office during the remaining portion of the in-use period. The amount of power remaining in the vehicle battery 21 is reduced by the running of the vehicle 20.

Figure 6:
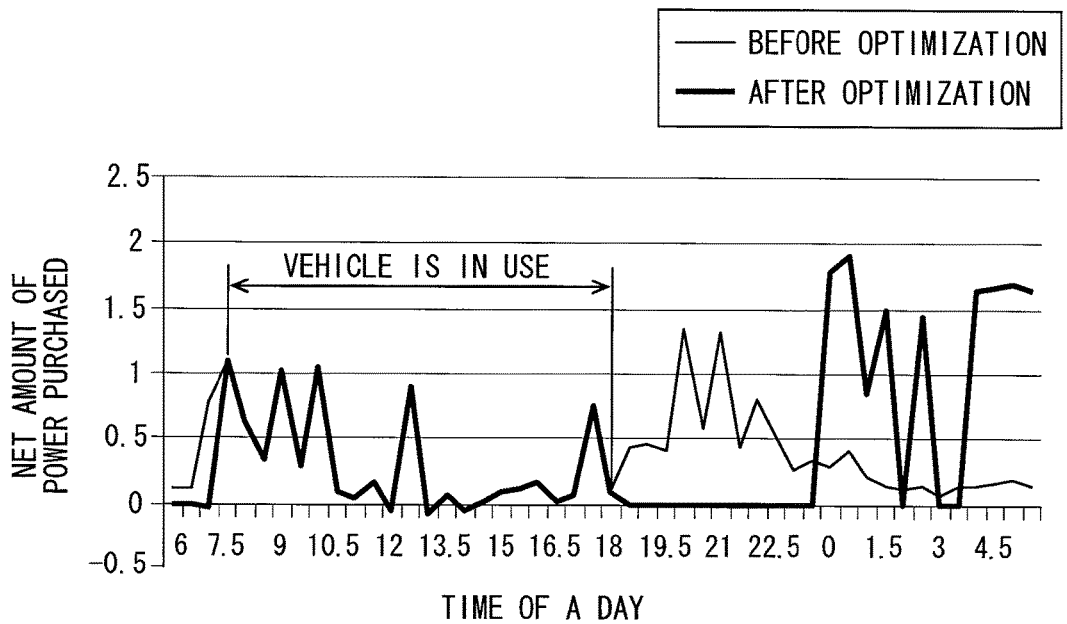
FIG. 6 is a graph showing the net amount of power purchased from a grid in a second case.
Figure 7:
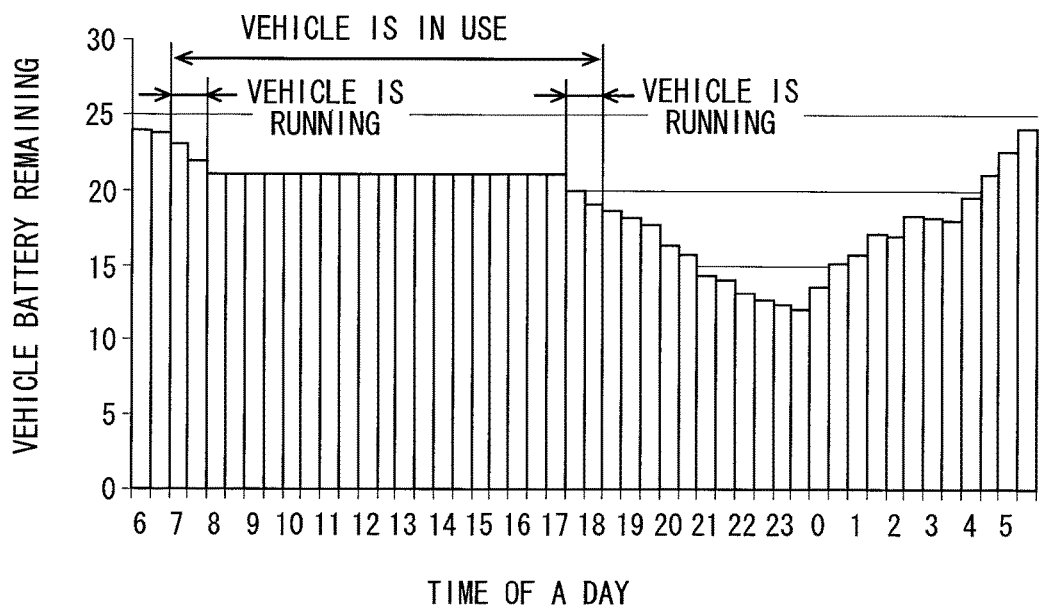
FIG. 7 is a graph showing the amount of power remaining in a vehicle battery in the second case.

As described above, according to the embodiment, the charging-discharging schedule is determined by calculating the optimization variables, and the power controller 18 controls the charging and discharging of the vehicle battery 21 in accordance with the charging-discharging schedule. Therefore, in the first case, the purchased power amount is unchanged between before and after optimization during the in-use period where the vehicle 20 is not connected to the plug-in station 15. However, the purchased power amount is changed between before and after optimization during an out-of-use period where the vehicle 20 is connected to the plug-in station 15. Specifically, after optimization, the vehicle battery 21 is charged by power supplied (i.e., purchased) from the power supplier during the price lowest period of from 0:00 (12 am) to 7:00 (7 am) and discharged to supply power to the building 11 during a period other than the price lowest period. Therefore, the purchased power amount during the period other than the price lowest period is much less after optimization than before optimization, FIG. 6 is a graph showing the net amount of power purchased from the power supplier in a second case. FIG. 7 is a graph showing the amount of power remaining in the vehicle battery 21 in the second case. The second case is where the vehicle 20 is used in the daytime for commuting. In the second case, the vehicle 20 is in use during an in-use period from 7:00 (7 am) to 18:00 (6 pm). In other words, the vehicle 20 is not connected to the plug-in station 15 during the in-use period. Specifically, the vehicle 20 is running to and from a user's office during some portion of the in-use period and parked at the office during the remaining portion of the in-use period. The amount of power remaining in the vehicle battery 21 is reduced by the running of the vehicle 20. A difference between the first case and the second case is that the amount of power consumed in the building 11 is larger in the second case than in the first case.

As described above, according to the embodiment, the charging-discharging schedule is determined by calculating the optimization variables, and the power controller 18 controls the charging and discharging of the vehicle battery 21 in accordance with the charging-discharging schedule. Therefore, in the second case, the purchased power amount is unchanged between before and after optimization during the in-use period where the vehicle 20 is not connected to the plug-in station 15. However, the purchased power amount is changed between before and after optimization during an out-of-use period where the vehicle 20 is connected to the plug-in station 15. Specifically, after optimization, the vehicle battery 21 is charged by power supplied (i.e., purchased) from the power supplier during the price lowest period and discharged to supply power to the building 11 during a period other than the price lowest period. Therefore, the purchased power amount during the period other than the price lowest period is much less after optimization than before optimization.

Figure 8:
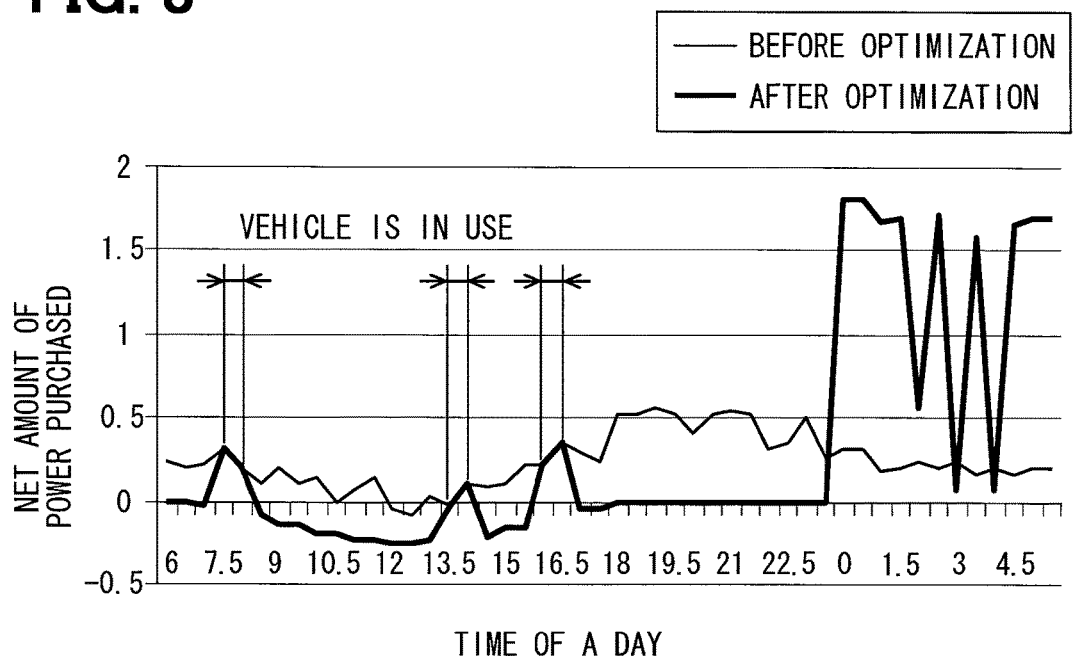
FIG. 8 is a graph showing the net amount of power purchased from a grid in a third case.
Figure 9:
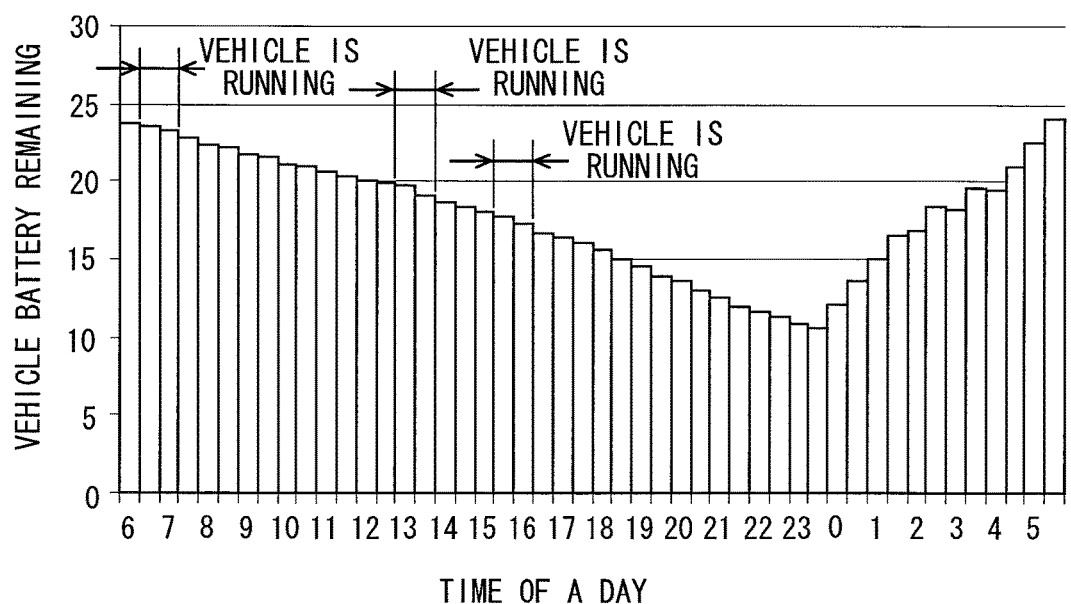
FIG. 9 is a graph showing the amount of power remaining in a vehicle battery in the third case.

FIG. 8 is a graph showing the net amount of power purchased from the power supplier in a third case. FIG. 9 is a graph showing the amount of power remaining in the vehicle battery 21 in the third case. The third case is where the vehicle 20 is used three times in the daytime by a homemaker or the like. In each of the three usages, the vehicle 20 runs for one hour. In other words, the vehicle 20 is not connected to the plug-in station 15 for three hours in total in the daytime. The amount of power remaining in the vehicle battery 21 is reduced by the running of the vehicle 20.

As described above, according to the embodiment, the charging-discharging schedule is determined by calculating the optimization variables, and the power controller 18 controls the charging and discharging of the vehicle battery 21 in accordance with the charging-discharging schedule. Therefore, in the third case, the purchased power amount is unchanged between before and after optimization during a period where the vehicle 20 is not connected to the plug-in station 15. However, the purchased power amount is changed between before and after optimization during a period where the vehicle 20 is connected to the plug-in station 15. Specifically, after optimization, the vehicle battery 21 is charged by power supplied (i.e., purchased) from the power supplier during the price lowest period and discharged to supply power to the building 11 during a period other than the price lowest period. Therefore, the purchased power amount during the period other than the price lowest period is much less after optimization than before optimization. Since the period where the vehicle 20 is connected to the plug-in station 15 is longer in the third case than in each of the first case and the second case, the net amount of power sold to the power supplier is larger in the third case than in each of the first case and the second case.

Figure 10:
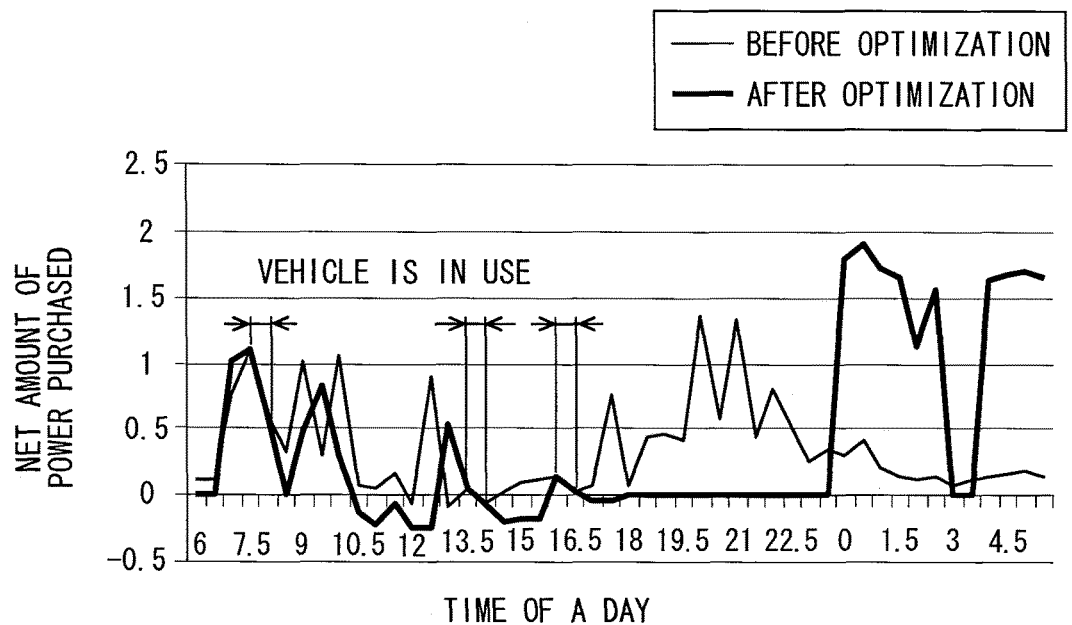
FIG. 10 is a graph showing the net amount of power purchased from a grid in a fourth case.
Figure 11:
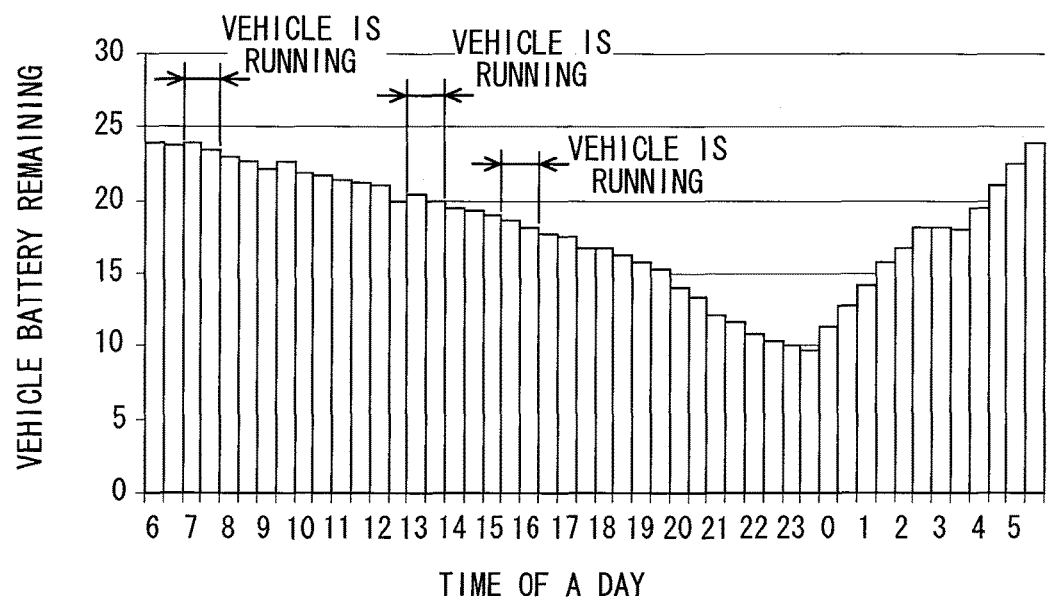
FIG. 11 is a graph showing the amount of power remaining in a vehicle battery in the fourth case.

FIG. 10 is a graph showing the net amount of power purchased from the power supplier in a fourth case. FIG. 11 is a graph showing the amount of power remaining in the vehicle battery 21 in the fourth case. The fourth case is where the vehicle 20 is used three times by a person (e.g., homemaker) in the building 11 in the daytime. In each of the three usages, the vehicle 20 runs for one hour. In other words, the vehicle 20 is not connected to the plug-in station 15 for three hours in total in the daytime. The amount of power remaining in the vehicle battery 21 is reduced by the running of the vehicle 20. A difference between the third case and the fourth case is that the amount of power consumed in the building 11 is larger in the fourth case than in the third case.

As described above, according to the embodiment, the charging-discharging schedule is determined by calculating the optimization variables, and the power controller 18 controls the charging and discharging of the vehicle battery 21 in accordance with the charging-discharging schedule. Therefore, in the fourth case, the purchased power amount is unchanged between before and after optimization during a period where the vehicle 20 is not connected to the plug-in station 15. However, the purchased power amount is changed between before and after optimization during a period where the vehicle 20 is connected to the plug-in station 15. Specifically, after optimization, the vehicle battery 21 is charged by power supplied (Le., purchased) from the power supplier during the price lowest period and discharged to supply power to the building 11 during a period other than the price lowest period. Therefore, the purchased power amount during the period other than the price lowest period is much less after optimization than before optimization. Since the period where the vehicle 20 is connected to the plug-in station 15 is longer in the fourth case than in each of the first case and the second case, the net amount of power sold to the power supplier is larger in the fourth case than in each of the first case and the second case. However, since the amount of power consumed in the building 11 is larger in the fourth case than in the third case, the net amount of power sold to the power supplier is less in the fourth case than in the third case.

Figure 12:
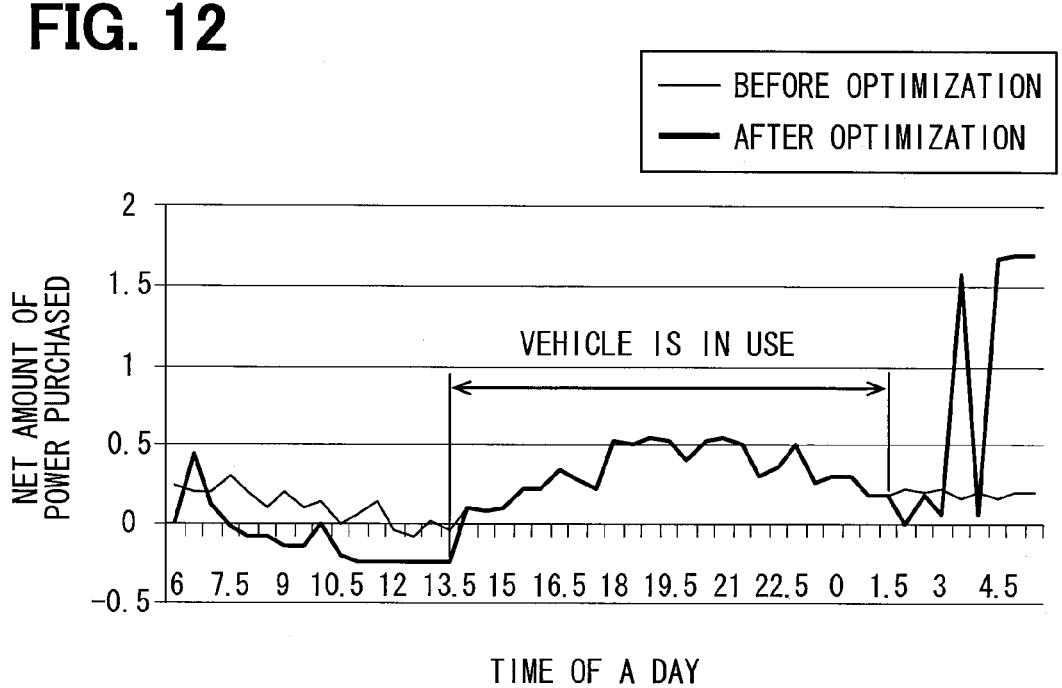
FIG. 12 is a graph showing the net amount of power purchased from a grid in a fifth case.
Figure 13:
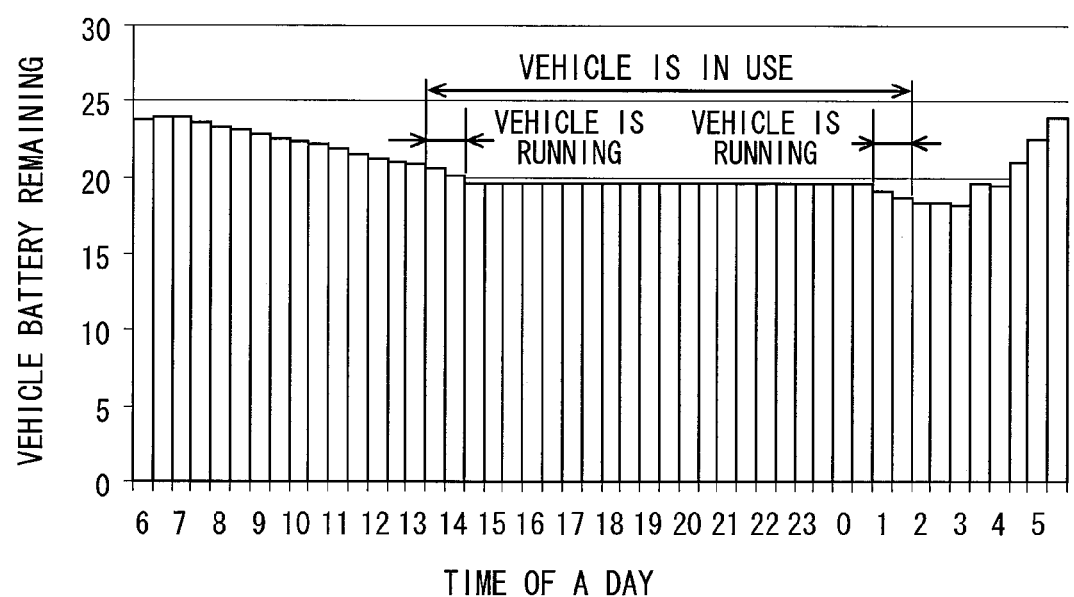
FIG. 13 is a graph showing the amount of power remaining in a vehicle battery in the fifth case.

FIG. 12 is a graph showing the net amount of power purchased from the power supplier in a fifth case. FIG. 13 is a graph showing the amount of power remaining in the vehicle battery 21 in the fifth case. The fifth case is where the vehicle 20 is used at twilight for commuting. In the fifth case, the vehicle 20 is in use during an in-use period from 13:00 (1 pm) to 2:00 (2 am). In other words, the vehicle 20 is not connected to the plug-in station 15 during the in-use period. Specifically, the vehicle 20 is running to and from a user's office during some portion of the in-use period and parked at the office during the remaining portion of the in-use period. The amount of power remaining in the vehicle battery 21 is reduced by the running of the vehicle 20.

As described above, according to the embodiment, the charging-discharging schedule is determined by calculating the optimization variables, and the power controller 18 controls the charging and discharging of the vehicle battery 21 in accordance with the charging-discharging schedule. Therefore, in the fifth case, the purchased power amount is unchanged between before and after optimization during a period where the vehicle 20 is not connected to the plug-in station 15. However, the purchased power amount is changed between before and after optimization during a period where the vehicle 20 is connected to the plug-in station 15. Specifically, after optimization, the net amount of power sold to the power supplier is increased.

Figure 14:
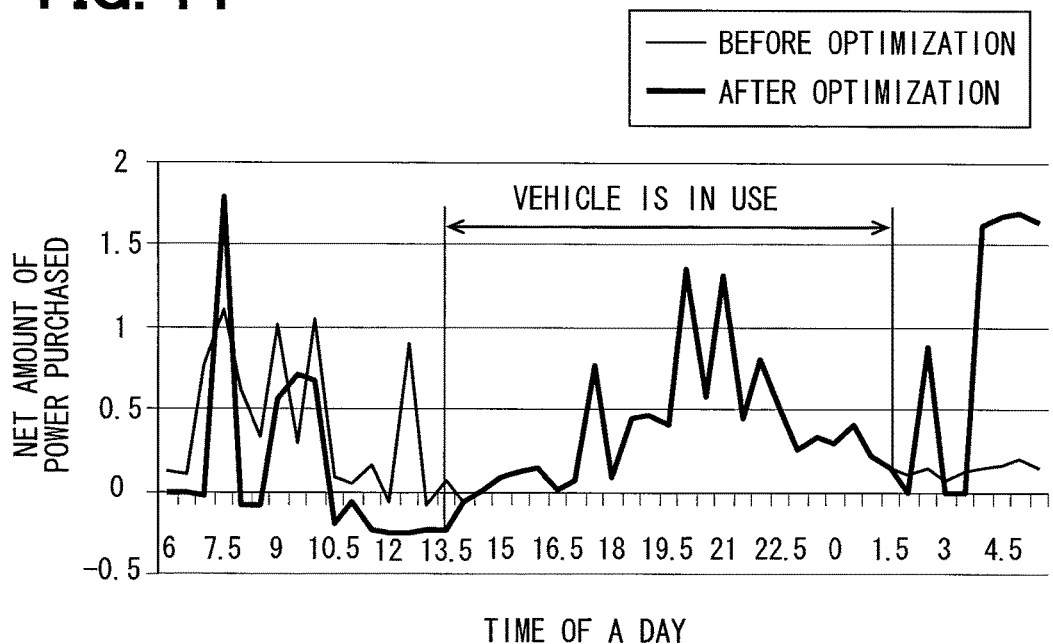
FIG. 14 is a graph showing the net amount of power purchased from a grid in a sixth case.
Figure 15:
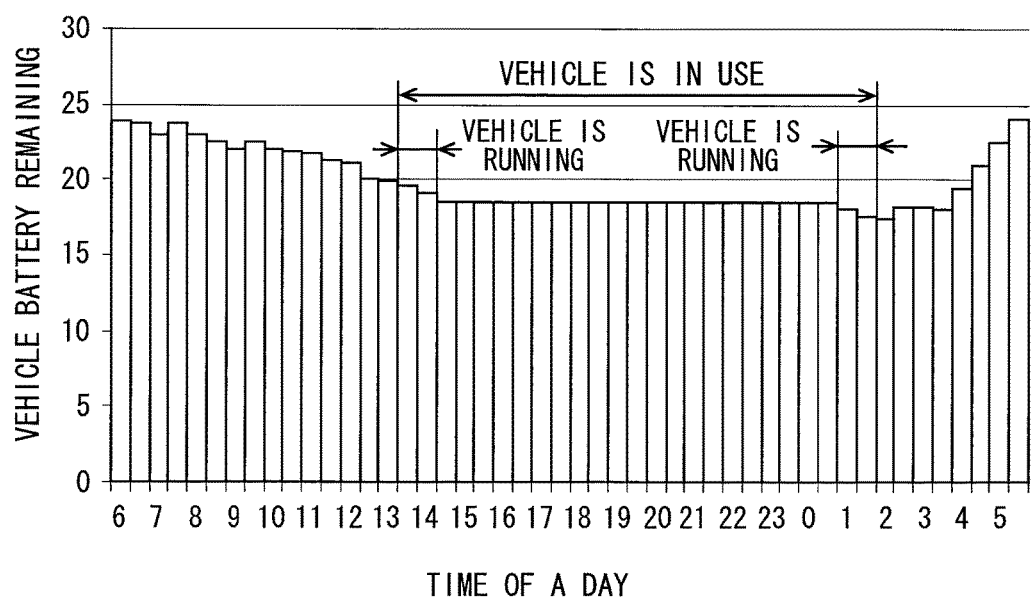
FIG. 15 is a graph showing the amount of power remaining in a vehicle battery in the sixth case.

FIG. 14 is a graph showing the net amount of power purchased from the power supplier in a sixth case. FIG. 15 is a graph showing the amount of power remaining in the vehicle battery 21 in the sixth case. Like the fifth case, the sixth case is where the vehicle 20 is used at twilight for commuting. In the sixth case, the vehicle 20 is in use during an in-use period from 13:00 (1 pm) to 2:00 (2 am). In other words, the vehicle 20 is not connected to the plug-in station 15 during the in-use period. Specifically, the vehicle 20 is running to and from a user's office during some portion of the in-use period and parked at the office during the remaining portion of the in-use period. The amount of power remaining in the vehicle battery 21 is reduced by the running of the vehicle 20. A difference between the fifth case and the sixth case is that the amount of power consumed in the building 11 is larger in the sixth case than in the fifth case.

As described above, according to the embodiment, the charging-discharging schedule is determined by calculating the optimization variables, and the power controller 18 controls the charging and discharging of the vehicle battery 21 in accordance with the charging-discharging schedule. Therefore, in the sixth case, the purchased power amount is unchanged between before and after optimization during a period where the vehicle 20 is not connected to the plug-in station 15. However, the purchased power amount is changed between before and after optimization during a period where the vehicle 20 is connected to the plug-in station 15. Specifically, after optimization, the net amount of power sold to the power supplier is increased. However, since the amount of power consumed in the building 11 is larger in the sixth case than in the fifth case, the net amount of power sold to the power supplier is less in the sixth case than in the fifth case.

In summary, the power controller 18 of the power supply system 10 according to the embodiment controls the charging and discharging of the power storage unit 14 and the vehicle battery 21 in accordance with the charging-discharging schedule. The power storage unit 14 and the vehicle battery 21 are hereinafter collectively referred to as the "power storing device". The charging-discharging schedule indicates a change in the charging and discharging of the power storing device during the predicted period. The charging-discharging schedule is determined based on the predicted consumption data and the predicted generation data in such a manner that the evaluation index can be the predetermined value. For example, the evaluation index can include the power price (i.e., electric bill) and the amount of carbon dioxide emissions. For example, the predetermined value can include a maximal value and a minimum value of the evaluation index.

The charging-discharging schedule is formulated as a mixed integer programming problem, which is a kind of mathematical programming problem. Thus, the charging-discharging schedule is mathematically derived. Typically, calculating a charging-discharging schedule is to solve a round robin problem subject to various constraints such as a battery capacity limit. It is difficult to solve such a round robin problem based on an armchair analysis. For this reason, according to the embodiment, the charging-discharging schedule is formulated as a mathematical programming problem, and optimum solutions to the mathematical programming problem are calculated by an optimization software. Specifically, the charging-discharging schedule is formulated as a mixed integer programming problem. In such an approach, optimum solutions to the mixed integer programming problem can be calculated uniquely based on the predicted consumption data and the predicted generation data. Therefore, optimum control can be achieved by controlling the charging and discharging of the power storing device in accordance with the calculated optimum solutions serving as the charging-discharging schedule According to the embodiment, the power controller 18 calculates the charging-discharging schedule of the power storage unit 14 installed at the building 11 and the vehicle battery 21 mounted on the vehicle 20 by formulating the charging-discharging schedule as a mixed integer programming problem. Thus, both the power storage unit 14 and the vehicle battery 21 can be efficiently used.

Further, according to the embodiment, the mixed integer programming problem has a linear inequality constraint that expresses a conditional branching using a logical variable. In such an approach, an object function can be represented by a single formula subject to a linear inequality constraint that expresses a conditional branching using a logical variable. Therefore, the optimum solutions can be calculated by the optimization software.

Further, according to the embodiment, the mixed integer programming problem has a constraint that prevents power stored in the power storing device from flowing back to the grid (refer to the section [NUMBUR 14]). In such an approach, it is possible to prevent the power stored in the power storing device from flowing back to the grid. Thus, even in a system for preventing the power stored in the power storing device from flowing back to the grid, an optimum charging-discharging schedule can be calculated.

Further, according to the embodiment, the power controller 18 calculates the charging-discharging schedule of the power storing device for the predicted period from the present time at the interval. The power controller 18 controls the charging and discharging of the power storing device in accordance with the calculated charging-discharging schedule during the first interval of the predicted period. In such an approach, even when the predicted data is out of prediction or even when data used for the prediction varies, the charging-discharging schedule can be updated based on the latest information. Thus, the power controller 18 can control the charging and discharging of the power storing device in accordance with the updated charging-discharging schedule during the next interval of the predicted period.

Further, according to the embodiment, an optimum device specification can be calculated, and the calculated device specification can be fed back for a device design. In such an approach, a capacity and charging-discharging capability of the power storing device can be suitably designed based on the calculated device specification so that the power storing device can be prevented from being overdesigned or overengineered. Thus, the cost of the power storing device can be reduced. Further, a desirable time period for use of the vehicle 20 can be determined by this method, and the determined time period can be reflected to a usage schedule of the vehicle 20.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiment, the off-grid power is generated by the solar power generator 16. A power generator for generating the off-grid power is not limited to the solar power generator 16. For example, a power generator for generating the off-grid power from wind energy, water energy, or geothermal energy can be used instead of the solar power generator 16.

In the embodiment, the charging-discharging schedule for one power storage unit 14 and one vehicle battery 21 is determined. The number of power storage devices, for which the charging-discharging schedule is determined, is not limited to two. For example, multiple power storage units 14 and multiple vehicle batteries 21 can be connected in the power supply system 10.

In the embodiment, the evaluation index is a power price (i.e., electric bill). The evaluation index is not limited to the power price. For example, the evaluation index can be the amount of carbon dioxide emissions. In this case, the charging-discharging schedule is determined in such a manner that the amount of carbon dioxide emissions can be minimized.

In the embodiment, the building 11 is a house. Alternatively, the building 11 can be a store, a factory, a warehouse, or the like.

In the embodiment, the vehicle 20 is a plug-in hybrid car. Alternatively, the vehicle 20 can be an electric car or the like. Further, the vehicle 20 can be a conventional engine car. In this case, the power stored in the vehicle battery 21 mounted on the vehicle 20 can be used for a purpose other than to drive the vehicle 20.

In the embodiment, the schedule determination process is performed at a regular interval of one hour. The interval is not limited to one hour. For example, the interval can be thirty minutes or two hours. Further, the interval can be an irregular interval. For example, as a difference between the actual value and the predicted data increases above a threshold value, the interval at which the schedule determination process is performed can be reduced. In such an approach, even when the predicted data is out of prediction, the control can be immediately corrected.

In the embodiment, the predicted period is twenty-four hours. The predicted period is not limited to twenty-four hours. For example, the predicted period can be twelve hours or six hours. That is, the predicted period can be N times the interval at which the schedule determination process is performed, where N is a positive integer greater than one. In other words, the interval is one Nth of the predicted period.

In the embodiment, the power storage unit 14 and the plug-in station 15 are separate pieces. Thus, flexibility in installation of the power storage unit 14 and the plug-in station 15 can be increased. Alternatively, the power storage unit 14 and the plug-in station 15 can be integrated as a single piece to simplify system configuration.

In the embodiment, the power storage unit 14 and the vehicle battery 21 are constructed with secondary cells. Alternatively, the power storage unit 14 and the vehicle battery 21 can be constructed with other elements such as capacitors.

What is claimed is:

1. A power supply system for supplying a grid power, fed from a grid of a power supplier under a power supply contact, to an electrical load connected to a wire wired in a building, the power supply system comprising:
   a solar power generator configured to generate solar power from sunlight;
   a power storing device connectable to the wire and configured to be charged to store the grid power and the solar power, the power storing device configured to be discharged to supply the stored power to the wire; and
   a power controller configured to control a consumption of the grid power and configured to control a consumption of the solar power, the consumption of the solar power resulting from at least one of a charge of the power storing device, a consumption in the load, and a discharge back to the grid, wherein
   the power controller calculates predicted consumption data based on a usage history of the load, the predicted consumption data indicating a change in a predicted amount of power consumed by the load for a predetermined predicted period,
   the power controller calculates predicted generation data based on predicted weather data, the predicted generation data indicating a change in a predicted amount of the solar power generated by the solar power generator for the predicted period, the predicted weather data indicating a change in a weather for the predicted period,
   the power controller calculates a charging-discharging schedule based on the predicted consumption data and the predicted generation data by formulating the charging-discharging schedule as a mixed integer programming problem in such a manner that an evaluation index for determining charging and discharging of the power storing device becomes a predetermined value, the charging-discharging schedule indicating a change in the charging and discharging of the power storing device for the predicted period, the power controller controls the charging and discharging of the power storing device in accordance with the calculated charging-discharging schedule, the power storing device includes a vehicle battery mounted on a vehicle and connectable to the wire, when the vehicle battery is connected to the wire, the vehicle battery is charged to store the grid power and discharged to supply the stored power to the wire, the power controller calculates the charging-discharging schedule based on the predicted consumption data, the predicted generation data, and a usage schedule of the vehicle battery by formulating the charging-discharging schedule as the mixed integer programming problem, and the usage schedule of the vehicle battery is calculated based on a usage history of the vehicle and indicates a period of time where the vehicle battery is electrically connected to the wire.

2. The power supply system according to claim 1, wherein the mixed integer programming problem has a first constraint, and the first constraint is a linear inequality constraint that expresses a conditional branching by using a logical variable.

3. The power supply system according to claim 1, wherein the mixed integer programming problem has a second constraint, and the second constraint prevents the stored power of the power storing device from flowing back to the grid.

4. The power supply system according to claim 1, wherein the power controller calculates the charging-discharging schedule for the predicted period from the present time at a regular interval, the interval is one Nth of the predicted period, where N is a positive integer greater than one, the power controller controls the charging and discharging of the power storing device in accordance with the calculated charging-discharging schedule during an initial part of the predicted period from the present time, and the initial part of the predicted period has a time length corresponding to the interval.

5. The power supply system according to claim 1, wherein the power controller includes an obtaining device and a memory device, the obtaining device obtains the predicted weather data, and the memory device stores the usage history of the load.

6. A power supply system for supplying a grid power, fed from a grid of a power supplier under a power supply contact, to an electrical load connected to a wire wired in a building, the power supply system comprising:

a power generator configured to generate off-grid power from a predetermined energy;

a power storing device connectable to the wire and configured to be charged to store the grid power and the off-grid power, the power storing device configured to be discharged to supply the stored power to the wire; and a power controller configured to control a consumption of the grid power and configured to control a consumption of the off-grid power, the consumption of the off-grid power resulting from at least one of a charge of the power storing device, a consumption in the load, and a discharge back to the grid, wherein the power controller calculates predicted consumption data based on a usage history of the load, the predicted consumption data indicating a change in a predicted amount of power consumed by the load for a predetermined predicted period, the power controller calculates predicted generation data based on predicted predetermined data, the predicted generation data indicating a change in a predicted amount of the off-grid power generated by the power generator for the predicted period, the predicted predetermined data indicating a change in the energy for the predicted period, the power controller calculates a charging-discharging schedule based on the predicted consumption data and the predicted generation data by formulating the charging-discharging schedule as a mixed integer programming problem in such a manner that an evaluation index for determining charging and discharging of the power storing device becomes a predetermined value, the charging-discharging schedule indicating a change in the charging and discharging of the power storing device for the predicted period, the power controller controls the charging and discharging of the power storing device in accordance with the calculated charging-discharging schedule, the power storing device includes a vehicle battery mounted on a vehicle and connectable to the wire, when the vehicle battery is connected to the wire, the vehicle battery is charged to store the grid power and discharged to supply the stored power to the wire, the power controller calculates the charging-discharging schedule based on the predicted consumption data, the predicted generation data, and a usage schedule of the vehicle battery by formulating the charging-discharging schedule as the mixed integer programming problem, and the usage schedule of the vehicle battery is calculated based on a usage history of the vehicle and indicates a period of time where the vehicle battery is electrically connected to the wire.

* * * * *